United States Patent [19]

Maeda et al.

[11] Patent Number: 5,756,603
[45] Date of Patent: May 26, 1998

[54] APPARATUS AND METHOD FOR PRODUCING 2-HYDROXYCARBOXYLIC ACID OLIGOMER

[75] Inventors: Hiroshi Maeda; Kunihiko Shimizu; Yuji Kurishiro, all of Osaka; Eiichi Kawada, Tokyo; Kazuhisa Fujisawa, Kobe, all of Japan

[73] Assignee: Kabushiki Kaisha Kobe Seiko Sho, Kobe, Japan

[21] Appl. No.: 859,029

[22] Filed: May 20, 1997

[30] Foreign Application Priority Data

May 24, 1996 [JP] Japan .................................. 8-130377

[51] Int. Cl.$^6$ .............................. C08F 2/00; C08G 85/00
[52] U.S. Cl. .................. 526/64; 528/354; 528/355; 528/361; 526/64; 526/65; 526/67; 526/68; 526/71
[58] Field of Search .................... 528/354, 355, 528/361; 526/64, 65, 67, 68, 71

[56] References Cited

U.S. PATENT DOCUMENTS

| | | | |
|---|---|---|---|
| 4,801,739 | 1/1989 | Franz et al. | 560/185 |
| 5,302,694 | 4/1994 | Buchholz | 528/354 |
| 5,310,865 | 5/1994 | Enomoto et al. | 528/361 |
| 5,401,796 | 3/1995 | Kashima et al. | 524/706 |
| 5,412,067 | 5/1995 | Shinoda et al. | 528/361 |
| 5,440,008 | 8/1995 | Ichikawa et al. | 528/361 |

*Primary Examiner*—Samuel A. Acquah
*Attorney, Agent, or Firm*—Oblon, Spivak, McClelland, Maier & Neustadt, P.C.

[57] ABSTRACT

The present invention provides a method capable of continuously efficiently producing a 2-hydroxycarboxylic acid oligomer while effectively removing the water contained in a raw material and the water produced by dehydration reaction. In production of a 2-hydroxycarboxylic acid oligomer by supplying a 2-hydroxycarboxylic acid to a reaction system, a dehydration system is provided between a raw material supply system and a polymerization reaction system so as to remove the water contained in the raw material and the water produced in the polymerization reaction system. As a result, the raw material in the dehydration system is concentrated and then supplied to the polymerization reaction system.

13 Claims, 1 Drawing Sheet

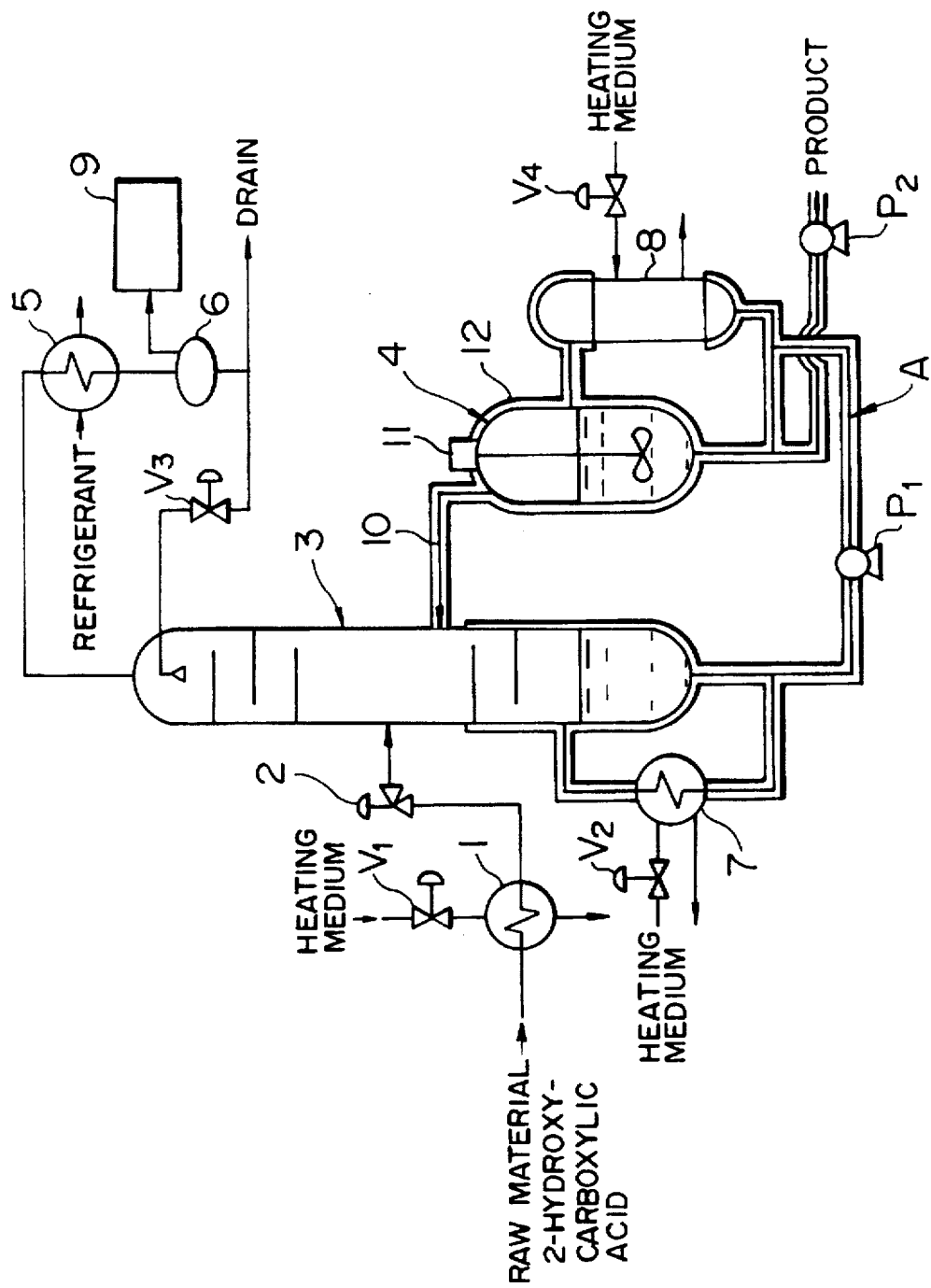
FIGURE

APPARATUS AND METHOD FOR PRODUCING 2-HYDROXYCARBOXYLIC ACID OLIGOMER

BACKGROUND OF THE INVENTION

1. Field of the Invention

The present invention relates to improvement in a method for continuously producing 2-hydroxycarboxylic acid oligomers useful as precursors for producing 2-hydroxycarboxylic acid cyclic dimers such as lactide, glycolide and the like, which are used as raw materials for biodegradable polymers.

2. Description of the Related Art

A biodegradable polymer which is degraded and assimilated in the natural world and living bodies has recently attracted attention as a material friendly to environment. Aliphatic synthetic polyesters such as polyglycolic acid, polylactic acid and copolymers thereof are known as representatives of such biodegradable polymers.

Synthetic polyesters are produced by using 2-hydroxycarboxylic acids such as glycolic acid, lactic acid, and the like. Of these synthetic polyesters, low molecular weight synthetic polyesters (referred to as "2-hydroxycarboxylic acid oligomers") having an average molecular weight of about 2,000 to 10,000 are produced directly by dehydration condensation using 2-hydroxycarboxylic acids as raw materials. However, high molecular weight synthetic polyesters having an average molecular weight of 150,000 to 200,000 cannot be easily produced directly from 2-hydroxycarboxylic acids. Therefore, such high molecular weight synthetic polyesters are produced by ring opening polymerization of 2-hydroxycarboxylic acid cyclic dimers such as lactide and glycolide, which were previously produced by thermal decomposition of 2-hydroxycarboxylic acid oligomers.

A 2-hydroxycarboxylic acid oligomer useful as a precursor for producing lactide or glycolide, as described above, is generally produced by a so-called batch system wherein a 2-hydroxycarboxylic acid used as a raw material is supplied to a polymerization reactor, and the produced 2-hydroxycarboxylic acid oligomer is recovered as a product from the polymerization reactor. In this case, for example, since lactic acid contains about 10% of water, and oligomerization reaction is dehydration condensation reaction, the reaction system contains a large amount of water. Although the water can be appropriately removed from the reactor, there is the problem of deteriorating the reaction rate. In addition, in this batch system, the amount of the oligomer contained in the removed water increases as reaction proceeds, and another device is thus required for recovering the lactic acid and/or oligomer from the removed water. Furthermore, in the batch system, the composition in the polymerization reactor changes as the reaction proceeds, and it is difficult to control change in the composition, thereby causing the problem of causing nonuniformity in quality of the produced oligomer. In addition, the temperature in the polymerization reactor rises as the reaction proceeds, with coloring or deterioration of the produced oligomer, and the corrosion resistance of the product tends to deteriorate as the production temperature rises. The produced oligomer is thus unsuitable for use as a component material.

As a method of producing an oligomer while removing the water produced in the reaction system, a technique is proposed in, for example, Japanese Patent Laid-Open No. 7-102044 in which a partial condenser is provided in a polymerization reactor. However, since this technique is basically proposed on the assumption that it is employed in the batch system, the above problems remain unsolved. This technique also has the problem that when a large amount of water generated in the reactor is removed as vapor, the raw material is easily contained in the vapor, and thus the reaction does not efficiently proceed.

Although, in the above technique, the raw material contained in the vapor is returned to the polymerization reactor, water in equilibrium with the raw material is also returned to the polymerization reactor together with the raw material, and thus it cannot be said that dehydration is efficiently achieved.

Japanese Patent Laid-Open No. 7-102044 also suggests that the polymerization reactor is longitudinally divided by partition plates, or a plurality of the reactors are arranged in series so that continuous operation can be carried out. However, such a construction complicates the apparatus structure, and thus increases equipment cost. This is also thought to cause difficulties in controlling the temperature and thus variations in quality of products. Therefore, this cannot be said to be practical means.

SUMMARY OF THE INVENTION

The present invention has been achieved for solving the problems of prior art, and an object of the invention is to provide a method capable of continuously efficiently producing a 2-hydroxycarboxylic acid oligomer while effectively removing water contained in a raw material and water produced by dehydration reaction.

In order to achieve the object, the present invention provides a method of continuously producing a 2-hydroxycarboxylic acid oligomer comprising supplying a 2-hydroxycarboxylic acid to a dehydration condensation reaction system wherein a raw material concentration system is provided between a raw material supply system and the dehydration condensation reaction system in order to remove water contained in the raw material and water produced in the dehydration condensation reaction system so that the raw material in the raw material concentration system is concentrated and then supplied to the dehydration condensation reaction system.

In the above method, a rectifying column can be used as the raw material concentration system, and a thermosiphon reaction system comprising a jacketed vertical reactor and a vertical heat exchanger can be used as the dehydration condensation reaction system.

BRIEF DESCRIPTION OF THE DRAWING

FIG. 1 is a schematic drawing illustrating the construction of an apparatus for carrying out the invention.

DESCRIPTION OF EMBODIMENT OF THE INVENTION

Efficient production of a 2-hydroxycarboxylic acid oligomer is said to depend upon how to efficiently remove the water contained in a raw material and the water produced by dehydration reaction. As a result of research performed by the inventors, it was found that the water contained in the raw material affects the reaction rate, and thus the reaction rate can be increased by removing the water contained in the raw material as much as possible. In order to improve the yield of the raw material and decrease cost by decreasing a load in waste treatment, the amount of the raw material removed together with water from a polymerization reactor is preferably decreased as much as possible. Further, since a batch system increases energy cost due to its inefficiency and is impossible of mass treatment, it is also important to achieve continuous operation.

In consideration of the above situation, the inventors performed research on specific means for solving the above problems from various viewpoints. As a result, it was found that the above object can successfully be achieved by operation while efficiently collectively removing the water contained in the raw material and the water generated in the polymerization reactor by a rectifying column. The present invention was achieved based on this finding.

The construction of the present invention will be described in detail with reference to the drawing. FIG. 1 is a schematic drawing illustrating the construction of an apparatus for carrying out the invention. Referring to FIG. 1, the apparatus comprises a preheater 1, a flush valve 2, a rectifying column as a dehydration system 3, a polymerization reactor (jacketed vertical reactor) 4, a condenser 5, a receiver 6, a heater 7, a heat exchanger (vertical heat exchanger) 8, an ejector 9, a vapor tube 10, a stirring motor 11, a jacket 12, pumps $P_1$ and $P_2$, and regulating valves $V_1$ to $V_4$. The apparatus is mainly characterized in that the rectifying column 3 is provided between a raw material supply system comprising the preheater 1, the flush valve 2 and the temperature regulating valve $V_1$, and the polymerization reactor 4. In this apparatus, the jacketed vertical reactor (the polymerization reactor 4) and the vertical heat exchanger (the heat exchanger 8) constitute a polymerization reaction system (a thermo-siphon reaction system).

In the construction of the apparatus shown in FIG. 1, a 2-hydroxycarboxylic acid (raw material) is first pre-heated to a predetermined temperature (for example, 150° to 170° C.) by the preheater 1. To the preheater 1 is supplied a heating medium such as steam or the like at a flow rate regulated by the temperature regulating valve $V_1$ so that the pre-heating temperature of the raw material is set. The pre-heated raw material is supplied to the rectifying column 3 through the flush valve 2.

The rectifying column 3 comprises a tray or a packed bed provided therein so that gas-liquid contact can be efficiently achieved. The water contained in the raw material and the water in the vapor produced in the polymerization reactor 4 described below are removed as water vapor through the top of the rectifying column 3, and the raw material supplied from the supply system and the unreacted raw material contained in the vapor are accumulated at the bottom of the rectifying column 3 while being concentrated (collectively referred to as "the concentrated raw material" hereinafter). At the bottom of the rectifying column 3 is provided the heater 7 in which the flow rate of a heating medium is regulated by the temperature regulating valve $V_2$, and thus the temperature of the bottom of the rectifying column is regulated so that the water contained in the raw material sent from the bottom of the rectifying column 3 is heated by the heater 7 and then returned to the rectifying column 3. Thereafter, only water is removed through the top of the rectifying column 3 to further concentrate the raw material. The heater 7 may be a type which is incorporated into the rectifying column 3, or when the rectifying column 3 has a low capacity and heat can be supplied to the rectifying column 3 by a low column jacket, the heater 7 need not be provided.

The water vapor removed through the top of the rectifying column 3 is cooled and condensed by the condenser 5, and then discharged to the outside of the system through the receiver 6. To the condenser 5 is supplied a refrigerant such as cooling water or the like. Part of the water sent to the receiver 6 from the condenser 5 is returned to the top of the rectifying column 3 at a flow rate regulated by the flow rate regulating valve $V_3$, and used for controlling the temperature of the top. On the other hand, the concentrated raw material accumulated at the bottom of the rectifying column 3 is sent to the heat exchanger 8 from the rectifying column 3 and the polymerization reactor 4 by the pump $P_1$, and used in polymerization reaction. In a positional relation (setting level) in which the level at the bottom of the rectifying column 3 and the level in the polymerization reactor 4 are properly maintained, the pump $P_1$ need not be provided.

The insides of the rectifying column 3, the polymerization reactor 4 and the heat exchanger 5 are controlled to an atmosphere under predetermined reduced pressure by the ejector 9. At the bottom of the rectifying column 3, dehydration polymerization reaction of the 2-hydroxycarboxylic acid used as the raw material proceeds.

Since a quantity of heat required for dehydration condensation reaction is supplied from the heat exchanger 8 in which the flow rate of a heating medium is regulated by the temperature regulating valve $V_4$, a large quantity of heat, which cannot be easily supplied only by the jacket 12, can be supplied to the concentrated raw material sent to the polymerization reaction system, and ideal circulating conditions for reaction and dehydration operations can be established between the polymerization reactor 4 and the heat exchanger 8 due to the thermosiphon effect. This enables large-capacity treatment. However, when the capacity is relatively small, and a quantity of heat necessary for reaction can be secured only by the polymerization reactor 4, the heat exchanger 8 need not be provided. The product produced by the polymerization reaction system is automatically sent to the next step by control of the rotational speed of the pump $P_2$ on the basis of a level detector (not shown) in the polymerization reaction system.

The water remaining in the raw material and the water produced by dehydration reaction are vaporized in the heat exchanger 8. The upper portion of the polymerization reactor 4 has a sufficient space for separating the gas sent from the heat exchanger 8 and the liquid. The vapor separated in this space is returned to the rectifying column 3 through the vapor tube 10. The vapor contains the unreacted raw material in equilibrium with the vapor, the raw material removed together with the vapor and water. The water contained in the vapor returned to the rectifying column 3 is removed by the rectifying column 3 as described above so that the raw material is concentrated and again returned to the reaction system.

The above-mentioned operation is repeated to decrease the amount of the water contained in the raw material as much as possible (for example, about 5 to 3%), and the amount of the water returned to the polymerization reaction system is very small. This makes possible effective dehydration and progress of stable reaction with high efficiency. The temperatures of the lower portion of the rectifying column 3, the polymerization reactor 4, the channel portions of the heater 7 and the heat exchanger 8, the tube for sending a liquid from the rectifying column 3, the circulating tube of the polymerization reaction system and the vapor tube 10 are protected by jackets.

In carrying out the present invention, the dehydration condensation reaction proceeds without the addition of a condensation polymerization catalyst. However, if required, it is effective to add a condensation polymerization catalyst such as tin, zinc, antimony, lead, an alkaline metal, or a mixture thereof, for example, at the position shown by arrow A in FIG. 1. This enables efficient reaction.

The present invention has the following advantages (a) to (f):

(a) Since the concentration of the raw material contained in the removed water can be decreased as much as possible, it is possible to improve the yield of the raw material, and decrease the cost of waste treatment by decreasing a load.

(b) The composition and reaction conditions in the polymerization reactor can stably be kept constant, and thus a uniform high-quality product can be produced.

(c) The water produced by dehydration condensation reaction can be securely removed from the polymerization reactor without being returned to the polymerization reactor, thereby enabling reaction with high efficiency, and decreasing the size of the apparatus and the equipment cost.

(d) Since high efficiency dehydration can be made, the running cost can Significantly be decreased.

(e) Since control can relatively easily be achieved, the operation can simply be carried out.

(f) Continuous operation can be achieved, thereby deceasing the running cost and permitting mass production.

In the apparatus shown in FIG. 1, the rectifying column is used as the dehydration system as an example, and the polymerization reactor 4 and the heat exchanger 8 are used as the polymerization reaction system as an example. However, these systems are not limited to the systems shown in the drawing, and any systems having other constructions may be used as long as the same functions can be attained.

The present invention constructed as described above enables continuous efficient production of a 2-hydroxycarboxylic acid oligomer while effectively removing the water contained in a raw material and the water produced by dehydration reaction.

What is claimed is:

1. An apparatus for producing a 2-hydroxycarboxylic acid oligomer by dehydration condensation of a 2-hydroxycarboxylic acid, comprising:

(1) a raw material supply system;

(2) a dehydration condensation reaction system;

(3) a raw material concentration system for recovering the unreacted 2-hydroxycarboxylic acid while removing the water contained in a raw material and the water produced in the dehydration condensation reaction system;

(4) a carrying passage for carrying the raw material from the raw material supply system to the raw material concentration system;

(5) a carrying passage for carrying the concentrated raw material dehydrated in the raw material concentration system to the dehydration condensation reaction system;

(6) a discharge passage for removing the water produced in the raw material concentration system from the raw material concentration system;

(7) a carrying passage for carrying the water produced in the dehydration condensation reaction system or water containing the raw material to the raw material concentration system; and (8) a carrying passage for recovering the 2-hydroxycarboxylic acid oligomer produced in the dehydration condensation reaction system.

2. An apparatus for producing a 2-hydroxycarboxylic acid oligomer according to claim 1, wherein the dehydration system comprises a rectifying column.

3. An apparatus for producing a 2-hydroxycarboxylic acid oligomer according to claim 2, further comprising means for heating the bottom of the rectifying column.

4. An apparatus for producing a 2-hydroxycarboxylic acid oligomer according to claim 1, further comprising means for heating the dehydration condensation reaction system.

5. An apparatus for producing a 2-hydroxycarboxylic acid oligomer according to claim 1, wherein the dehydration condensation reaction system is a thermosiphon reaction system comprising a jacketed vertical reactor and a vertical heat exchanger.

6. An apparatus for producing a 2-hydroxycarboxylic acid oligomer according to claim 1, further comprising a heater and a flush valve which are provided on the carrying passage for carrying the raw material from the raw material supply system to the raw material concentration system.

7. A method of producing a 2-hydroxycarboxylic acid oligomer by dehydration condensation of a 2-hydroxycarboxylic acid, comprising:

introducing a raw material and the raw material containing water produced by dehydration condensation reaction to a raw material concentration system;

continuously removing the water contained in the raw material and the water produced by the dehydration condensation to recover and concentrate the raw material in the raw material concentration system;

supplying the concentrated raw material to the dehydration condensation reaction system.

8. A method of producing a 2-hydroxycarboxylic acid oligomer according to claim 7, wherein the raw material concentration system comprises a rectifying column.

9. A method of producing a 2-hydroxycarboxylic acid oligomer according to claim 8, wherein the bottom of the rectifying column is heated to effect dehydration condensation reaction of the concentrated raw material.

10. A method of producing a 2-hydroxycarboxylic acid oligomer according to claim 7, wherein part or the entirety of the vapor recovered from the rectifying column through the top thereof is condensed, and part of the condensate is returned to the rectifying column, and remaining vapor and/or the residue is exhausted.

11. A method of producing a 2-hydroxycarboxylic acid oligomer according to claim 10, wherein the temperature of the upper portion of the rectifying column is controlled by using the condensate returned to the rectifying column.

12. A method of producing a 2-hydroxycarboxylic acid oligomer according to claim 7, wherein the dehydration condensation reaction system is a thermo-siphon reaction system comprising a jacketed vertical reactor and a vertical heat exchanger.

13. A method of producing a 2-hydroxycarboxylic acid oligomer according to claim 7, wherein tin, zinc, antimony, lead, an alkaline metal or a mixture thereof is used as a dehydration condensation reaction catalyst.

* * * * *